United States Patent
Manula et al.

(10) Patent No.: US 9,148,352 B2
(45) Date of Patent: Sep. 29, 2015

(54) METHOD AND SYSTEM FOR DYNAMIC REPURPOSING OF PAYLOAD STORAGE AS A TRACE BUFFER

(71) Applicant: Oracle International Corporation, Redwood Shores, CA (US)

(72) Inventors: Brian Edward Manula, Oslo (NO); Morten Schanke, Oslo (NO); Knut Hallvard Tvete, Kurland (NO)

(73) Assignee: Oracle International Corporation, Redwood Shores, CA (US)

( * ) Notice: Subject to any disclaimer, the term of this patent is extended or adjusted under 35 U.S.C. 154(b) by 328 days.

(21) Appl. No.: 13/722,083

(22) Filed: Dec. 20, 2012

(65) Prior Publication Data

US 2014/0177633 A1 Jun. 26, 2014

(51) Int. Cl.
H04B 3/20 (2006.01)
H04L 12/26 (2006.01)

(52) U.S. Cl.
CPC .............. *H04L 43/028* (2013.01); *H04L 43/04* (2013.01)

(58) Field of Classification Search
CPC ....................................................... H04L 43/04
See application file for complete search history.

(56) References Cited

U.S. PATENT DOCUMENTS

| | | | |
|---|---|---|---|
| 6,459,698 B1 | 10/2002 | Acharya | |
| 6,563,790 B1 | 5/2003 | Yu et al. | |
| 6,741,559 B1 | 5/2004 | Smeulders et al. | |
| 6,789,143 B2 | 9/2004 | Craddock et al. | |
| 6,917,987 B2 | 7/2005 | Parthasarathy et al. | |
| 7,136,353 B2 | 11/2006 | Ha et al. | |
| 7,330,918 B2 | 2/2008 | Yamamoto et al. | |
| 7,496,698 B2 | 2/2009 | Biran et al. | |
| 7,609,636 B1 | 10/2009 | Mott | |
| 7,742,497 B2 | 6/2010 | Ganti et al. | |
| 7,769,015 B2 | 8/2010 | Huang et al. | |
| 7,782,805 B1 | 8/2010 | Belhadj et al. | |
| 7,787,366 B2 | 8/2010 | Cuffaro et al. | |
| 7,817,634 B2 | 10/2010 | Coffman et al. | |
| 7,830,919 B1 | 11/2010 | Thompson | |
| 7,899,050 B2 | 3/2011 | Craddock et al. | |
| 8,244,946 B2 | 8/2012 | Gupta et al. | |
| 8,255,475 B2 | 8/2012 | Kagan et al. | |
| 8,259,576 B2 | 9/2012 | Lee et al. | |
| 8,259,746 B2 | 9/2012 | Lo et al. | |
| 8,274,976 B2 | 9/2012 | Aloni et al. | |
| 8,296,386 B1 | 10/2012 | Micalizzi, Jr. | |
| 2001/0036185 A1 | 11/2001 | Dempo | |
| 2003/0101158 A1 | 5/2003 | Pinto et al. | |
| 2005/0018669 A1 | 1/2005 | Arndt et al. | |
| 2005/0060443 A1 | 3/2005 | Rosner | |
| 2005/0135419 A1 | 6/2005 | Pullen et al. | |

(Continued)

*Primary Examiner* — Maharishi Khirodhar
(74) *Attorney, Agent, or Firm* — Osha Liang LLP

(57) ABSTRACT

A method for debugging network activity involving receiving, by HCA, a packet stream comprising multiple packets, comparing a packet header of each of the packets to a trigger condition to determine whether the trigger condition has been met, after the trigger condition has been met, comparing each packet header of the packets to one or more trace filters stored in the HCA to identify matching packets, duplicating one or more portions of the matching packets and storing the duplicated portions of the matching packets in a trace buffer, where the trace buffer is located in the HCA and is dynamically repurposed from a payload RAM to the trace buffer when a corresponding port of the HCA for transmitting or receiving the packet stream is set to trace mode, and stopping the trace and copying the one or more portions of packets from the trace buffer to host memory.

19 Claims, 5 Drawing Sheets

(56) References Cited

U.S. PATENT DOCUMENTS

| | | |
|---|---|---|
| 2005/0223118 A1 | 10/2005 | Tucker et al. |
| 2006/0155932 A1* | 7/2006 | Rasche et al. ............... 711/125 |
| 2006/0224928 A1* | 10/2006 | Cardinell et al. ............ 714/45 |
| 2007/0008886 A1 | 1/2007 | Chen et al. |
| 2007/0019665 A1 | 1/2007 | Benveniste |
| 2007/0165672 A1 | 7/2007 | Keels et al. |
| 2007/0223472 A1 | 9/2007 | Tachibana et al. |
| 2007/0223483 A1 | 9/2007 | Huang et al. |
| 2007/0242686 A1 | 10/2007 | Zegers et al. |
| 2008/0140984 A1 | 6/2008 | Shearer |
| 2008/0168194 A1 | 7/2008 | Gregg et al. |
| 2009/0125604 A1 | 5/2009 | Chang et al. |
| 2011/0216648 A1 | 9/2011 | Mehrotra et al. |
| 2012/0239832 A1 | 9/2012 | Subramanian et al. |

* cited by examiner

METHOD AND SYSTEM FOR DYNAMIC REPURPOSING OF PAYLOAD STORAGE AS A TRACE BUFFER

BACKGROUND

The Infiniband® network includes nodes that communicate through a channel-based switched fabric (Infiniband® is a registered trademark of Infiniband Trade Association, located in Beaverton, Oreg.). For example, the nodes may be a host, an input/output subsystem, or a router which connects to another network. The switched fabric is made up of a collection of switches, routers, and/or links that connect a set of channel adapters. The channel adapters form an interface between the switched fabric and the nodes. The channel adapter of the host is referred to as a host channel adapter. The channel adapter of an I/O subsystem is referred to as a target channel adapter.

In Infiniband®, two processes communicate using a queue pair. A queue pair includes a send queue and a receive queue. Specifically, in order for a process to send a message to another process, the process posts the message to the send queue. The host channel adapter sends the message in the form of packets to the channel adapter having the receive queue. Each packet that is sent includes at least an Infiniband® header and a packet payload. The payload is typically stored in on-chip random access memory (RAM). Logic associated with the receive queue ensures that packets are processed in a particular order using packet sequence numbers.

Infiniband® supports operations such as remote direct memory access (RDMA) read and write operations. Specifically, a requesting process may send a request in the message for the receiver to store data and/or return data. In response, the remote node's channel adapter includes functionality to store and/or return the requested data to the requesting process. As with any type of transmission and response system, errors may occur in networking activity, e.g., during packet transmission or reception. When errors occur, dedicated hardware is provided to collect and data for debugging purposes.

SUMMARY

In general, in one aspect, the invention relates to a method for debugging network activity, comprising receiving, by the host channel adapter (HCA), a packet stream comprising a plurality of packets, comparing a packet header of each of the plurality of packets to a trigger condition to determine whether the trigger condition has been met, after the trigger condition has been met, comparing each packet header of the plurality of packets to one or more trace filters stored in the HCA to identify matching packets, duplicating one or more portions of the matching packets and storing the duplicated one or more portions of the matching packets in a trace buffer, wherein the trace buffer is located in the HCA and is dynamically repurposed from a payload RAM to the trace buffer when a corresponding port of the HCA for transmitting or receiving the packet stream is set to trace mode, and stopping the trace and copying the one or more portions of packets from the trace buffer to host memory.

In general, in one aspect, the invention relates to a host channel adapter (HCA), comprising at least two ports for transmitting and receiving a packet stream, wherein each of the at least two ports operate in one selected from a group consisting of normal mode and trace mode, a trace buffer configured to store trace data corresponding to each of the at least two ports of the HCA, wherein the trace buffer is dynamically repurposed from a payload RAM to the trace buffer when the corresponding port of the HCA is set to trace mode, a packet receive module (PRM) comprising a set of CSRs for storing trace parameters, and at least one multiplexer for duplicating the packet stream from one of the at least two ports and storing the duplicated packet stream to the corresponding trace buffer when the one of the at least two ports is in trace mode, and a direct memory access (DMA) engine configured to continuously read trace data out of the trace buffer and write the trace data to host memory, wherein the HCA is configured to receive the packet stream comprising a plurality of packets, compare a packet header of each of the plurality of packets to a trigger condition stored in one CSR of the set of CSRs to determine whether the trigger condition has been met, after the trigger condition has been met, compare each packet header of the plurality of packets to one or more trace filters stored in the set of CSRs to identify matching packets, duplicate and store, via the multiplexer, one or more portions of the matching packets to the corresponding trace buffer, and stop the trace, wherein after the trace is stopped, the one or more portions of packets in host memory are analyzed for debugging errors.

In general, in one aspect, the invention relates to a system, comprising a host comprising memory, a host channel adapter operatively connected to the host and comprising at least two ports for transmitting and receiving a packet stream, wherein each of the at least two ports operate in one selected from the group consisting of normal mode and trace mode, a trace buffer configured to store trace data corresponding to each of the at least two ports of the HCA, wherein the trace buffer is dynamically repurposed from a payload RAM to the trace buffer when the corresponding port of the HCA is set to trace mode, a set of CSRs for storing trace parameters, and at least one multiplexer for duplicating the packet stream from one of the at least two ports and storing the duplicated packet stream to the corresponding trace buffer when the one of the at least two ports is in trace mode, and an embedded processing system (EPS) configured to request a trace to be initiated on the HCA, and read trace data out of the trace buffer and write the trace data to host memory, wherein the HCA is configured to receive the packet stream comprising a plurality of packets, compare a packet header of each of the plurality of packets to a trigger condition stored in one CSR of the set of CSRs to determine whether the trigger condition has been met, after the trigger condition has been met, compare each packet header of the plurality of packets to one or more trace filters stored in the set of CSRs to identify matching packets, duplicating and storing, via the multiplexer, one or more portions of the matching packets to the corresponding trace buffer, and stop the trace.

Other aspects of the invention will be apparent from the following description and the appended claims.

DETAILED DESCRIPTION

Figure 1:
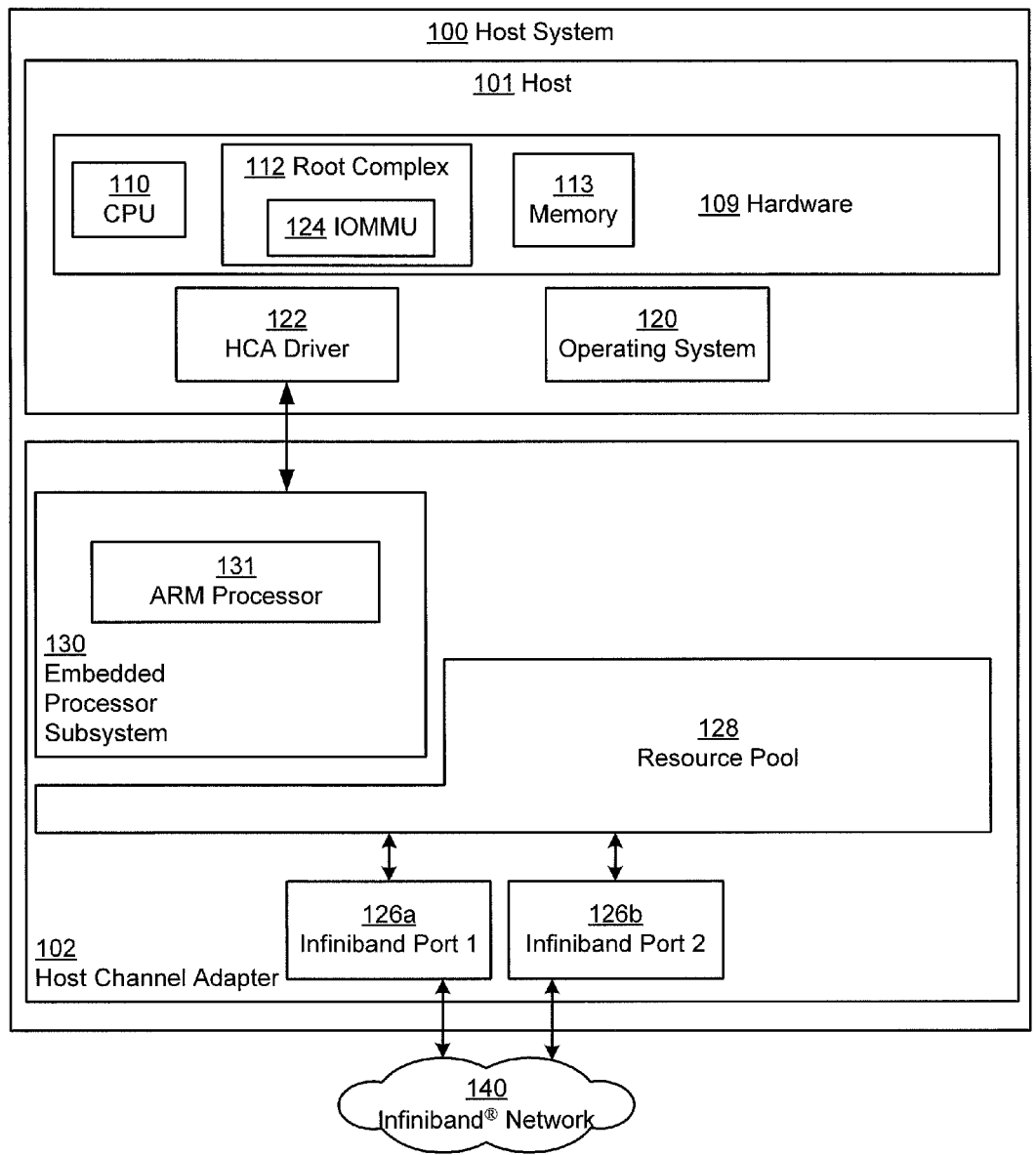
FIG. 1 shows a host system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and an apparatus for dynamic repurposing of an on-chip payload storage as a trace buffer. More specifically, embodiments of the invention provide a method and system for configuring a debug trace and storing trace data in a trace buffer on an on-demand basis using an idle port of an Infiniband® host channel adapter.

FIG. 1 shows a schematic diagram of a host system (100) in one or more embodiments of the invention. In one or more embodiments of the invention, the host system (100) is any physical computing device. Specifically, the host system (100) includes at least a minimum amount of hardware necessary to process instructions. As shown in FIG. 1, the host system (100) includes a host (101) and a host channel adapter (HCA) (102) in one or more embodiments of the invention. These components are discussed below.

In one or more embodiments of the invention, the host (101) includes an HCA driver (122), an operating system (120), and a root complex (112). Although not shown, in one or more embodiments of the invention, the host (101) may be a virtualized host including one or more virtual machines (not shown), which are distinct operating environments configured to inherit underlying functionality of the host operating system via an abstraction layer.

In one or more embodiments of the invention, the HCA driver (122) is software that provides an interface to the HCA (102) for the operating system (120). Specifically, when the operating system wants to send commands to the HCA (102), the operating system (120) invokes a routine in the HCA driver (122). In one embodiment of the invention, the host operating system (120) may include both virtual machines and virtual execution environments.

Continuing with the host, the host (101) includes hardware (109). The hardware (109) may include, for example, a central processing unit (110), memory (113), and a root complex (112). In one or more embodiments of the invention, the CPU (110) is a hardware processor component for processing instructions of the host. The CPU (110) may include multiple hardware processors. Alternatively or additionally, each hardware processor may include multiple processing cores. In general, the CPU (110) is any device configured to execute instructions on the host (101).

In one or more embodiments of the invention, the memory (113) is any type of hardware device for storage of data. In one or more embodiments of the invention, the memory (113) may be partitioned. In one or more embodiments of the invention, the memory (113) includes functionality to store a send queue (not shown). In one or more embodiments of the invention, a send queue includes an ordered list of command identifiers for commands for processing by the host channel adapter (102). In one or more embodiments of the invention, the command identifiers may be the actual commands and/or references to the commands.

In one or more embodiments of the invention, the root complex (112) includes functionality to connect the CPU and memory subsystem to a peripheral component interconnect (PCI) Express switch fabric. Specifically, in one or more embodiments of the invention, the root complex (112) connects the host (101) to the host channel adapter (102). Although FIG. 1 shows the root complex (112) as separate from the CPU (110), the root complex (112) may be integrated as part of the CPU.

The root complex (112) includes an input/output memory management unit (IOMMU) (124) in one or more embodiments of the invention. The IOMMU (124) includes functionality to connect a direct memory access (DMA) input/output (I/O) bus to the memory. In one or more embodiments of the invention, the IOMMU (124) includes functionality to translate addresses from one level of abstraction to another.

Continuing with FIG. 1, the host (101) is connected to the host channel adapter (102). In one or more embodiments of the invention, the connection between the host (101) and the host channel adapter (102) may be a PCI express connection. Specifically, the host channel adapter may connect to a PCI express fabric connector on the host.

In one or more embodiments of the invention, the host channel adapter (102) is a hardware device configured to connect the host (101) to the Infiniband® network (140). Specifically, the host channel adapter (102) includes functionality to receive commands from the host (101) and process the commands. Processing the commands may include performing DMA with host memory to obtain and store packet data and to obtain control information, performing any validation required on the packet data, generating packets from the packet data, and transmitting and receiving packets on the Infiniband® network (140). FIG. 1 shows a schematic diagram of the host channel adapter (102) from the prospective of the host (101). As shown in FIG. 1, the host channel adapter (102) includes at least one Infiniband® port (e.g., Infiniband® port 1 (126a), Infiniband® port 2 (126b)), a resource pool (128), and an embedded processor subsystem (130). Each of the components of the host channel adapter is discussed below.

In one or more embodiments of the invention, an Infiniband® port (e.g., Infiniband® port 1 (126a), Infiniband® port 2 (126b)) is a physical interface connector between the host channel adapter (102) and the Infiniband® network (140). In one or more embodiments of the invention, each Infiniband® port (126a, 126b) shown in FIG. 1 includes two input/output ports. Thus, for example, Infiniband® port 1 (126a) includes two separate ports, and Infiniband® port 2 (126b) also includes two separate ports. Two ports are provided for redundancy so that if one port fails, another is available for input/output to/from the Infiniband® network. In one or more embodiments of the invention, each of the two ports for each Infiniband® port (126a, 126b) shown have mode bits associated with the port. Port modes may include active, idle, or trace. In one or more embodiments of the invention, the Infiniband® ports have two modes: normal mode and trace mode. A mode bit corresponding to the port mode may be set to indicate the mode of operation for a particular port. Trace mode is a mode during which normal packet transmission/reception via the corresponding port is not performed. Instead, the port set to trace mode is used to duplicate and store the normal packet stream in a trace buffer where the data is collected and analyzed for purposes of debugging of network activity. Trace mode provides for visibility into potential network processing errors. When a port is idle (i.e., not actively used to send/receive data), the port may be used for tracing purposes in trace mode. Alternatively, a port in normal mode may be switched to trace mode when, for example, transmission/reception traffic is less than a predetermined threshold. Although FIG. 1 shows two Infiniband® ports, fewer or more ports may exist without departing from the invention. In such a scenario, one or more of the ports may have the functionality described above.

The resource pool (128) is a collection of resources that are required to send and receive packets on the Infiniband® network. Specifically, the resource pool (128) corresponds to the collection of hardware and stored data that is accessible by the host (101) and may be shared among virtual machines on the host (101). The resource pool (128) is discussed in FIG. 2 below.

The embedded processor subsystem (130) corresponds to an embedded processor and logic for managing the host channel adapter (102). The embedded processor subsystem (EPS) (130) includes functionality to receive and process the management commands on the HCA. For example, the management commands may be to change the allocation of HCA resources, change the configuration of the HCA, and perform other management of the HCA. In one or more embodiments of the invention, the embedded processor subsystem is made up of an ARM processor (131). In one or more embodiments of the invention, the ARM processor (131) is configured to read out trace data stored in the trace buffer when one or more of the Infiniband® ports (126a, 126b) are operating in trace mode. The ARM processor (131) of the EPS (130) includes functionality to directly access data stored in the trace buffer and move the trace data into shared memory or to memory (113) in the host (101). In one or more embodiments of the invention, the EPS (130), via the ARM processor (131), is also configured to request that a trace be started to collect data for purposes of debugging network activity. In alternate embodiments of the invention, a trace may be requested by the HCA driver (122) or a physical function (not shown) in the resource pool (128) configured to expose the actual hardware of the HCA (102) to the operating system (120). Specifically, by way of the physical function, the operating system (120) may control the HCA (102).

Figure 2:
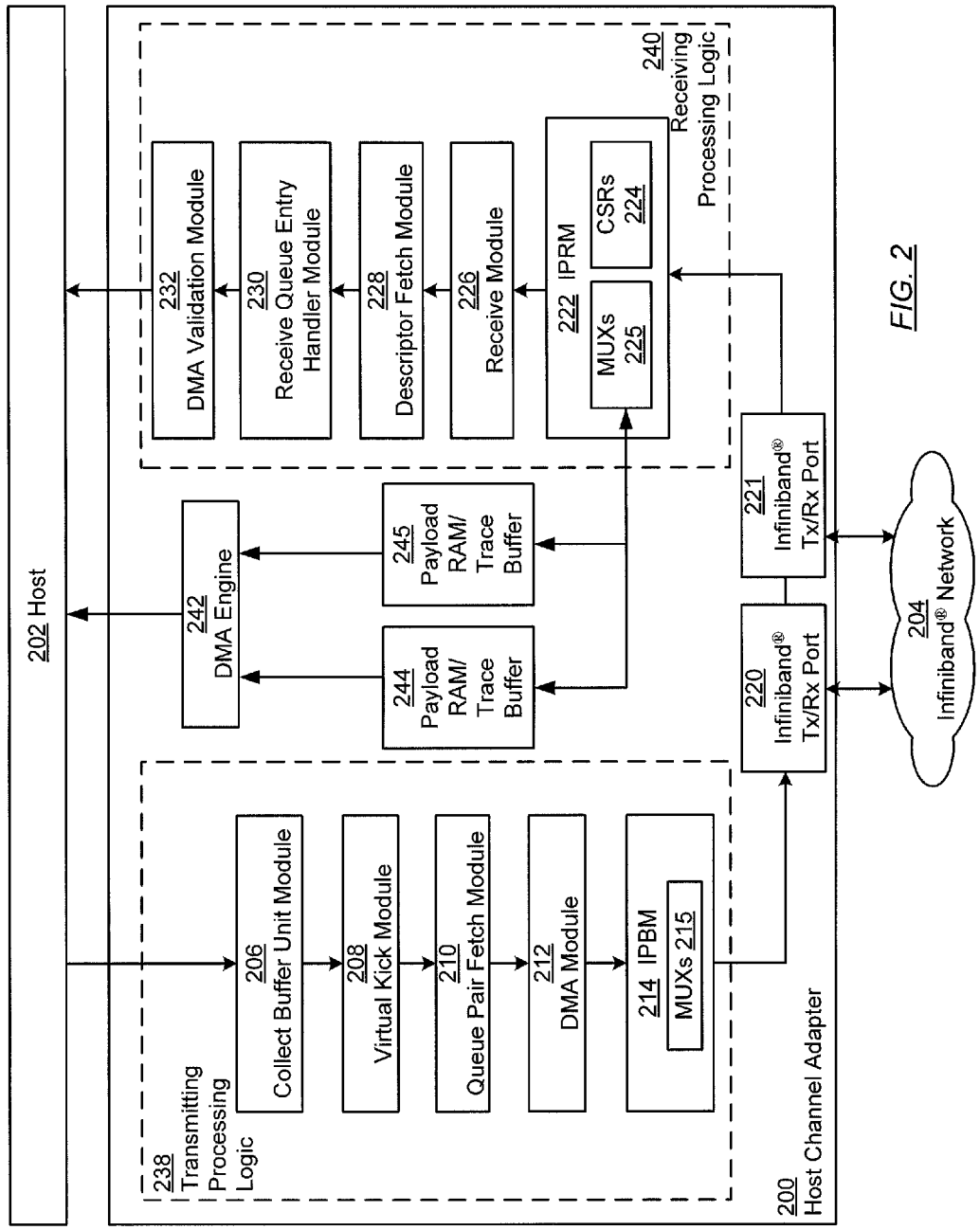
FIG. 2 shows a host channel adapter in accordance with one or more embodiments of the invention.

As discussed above, FIG. 1 provides a general diagram of the host channel adapter (102) in one or more embodiments of the invention. The invention is not limited to the HCA architecture shown in FIG. 1. FIG. 2 shows a schematic diagram of the resources of the host channel adapter (HCA) (200) in one or more embodiments of the invention. Specifically, FIG. 2 shows components of the resource pool for transmission of messages on the Infiniband® network (204).

As shown in FIG. 2, the host channel adapter (200) may include a collect buffer unit module (206), a virtual kick module (208), a queue pair fetch module (210), a direct memory access (DMA) module (212), an Infiniband® packet builder module (214), one or more Infiniband® ports (220), an Infiniband® packet receiver module (222), a receive module (226), a descriptor fetch module (228), a receive queue entry handler module (230), and a DMA validation module (232). In the host channel adapter of FIG. 2, the host channel adapter includes both transmitting processing logic (238) for sending messages on the Infiniband® network (204) and responder processing logic (240) for responding to messages from the Infiniband® network (204). In one or more embodiments of the invention, the collect buffer unit module (206), virtual kick module (208), queue pair fetch module (210), direct memory access (DMA) module (212), Infiniband® packet builder module (214), and completion module (216) may be components of the transmitting processing logic (238). The Infiniband® packet receiver module (222), receive module (226), descriptor fetch module (228), receive queue entry handler module (230), and DMA validation module (232) may be components of the responder processing logic (240). As shown, the completion module may be considered a component of both the transmitting processing logic (238) and the responder processing logic (240) in one or more embodiments of the invention.

In general, the HCA (200) is configured to receive and execute commands from the host (202). Each of the aforementioned modules is configured to process data units. Each data unit corresponds to a command or a received message or packet. For example, a data unit may be the command, an address of a location on the communication adapter storing the command, a portion of a message corresponding to the command, a packet, an identifier of a packet, or any other identifier corresponding to a command, a portion of a command, a message, or a portion of a message. Moreover, for purposes of embodiments of the invention, the term "message" is synonymous with both "work request" and "original work request." Specifically, an original work request is sent from a software application executing on the host (202), or, more specifically, from a user of a software application executing on the host (202). Accordingly, in embodiments of the invention, an original work request refers to a request which a send queue of a queue pair (QP) issues to a receive queue of the same QP. Each QP sends to and receives from QPs on other nodes.

Infiniband® supports two basic forms of work requests: sends and RDMAs. A send is sending a message including data from the sender to the receiver, where the receiver delivers the data to a locally managed receive queue. RDMAs are operations whereby the requester specifies the remote memory address on which the request will operate. RDMAs may be RDMA Reads, RDMA Writes, and Atomic Operations (discussed further below).

The dark arrows between modules show the transmission path of data units between modules as part of processing commands and received messages in one or more embodiments of the invention. Data units may have other transmission paths (not shown) without departing from the invention. Further, other communication channels and/or additional components of the host channel adapter (200) may exist without departing from the invention. Each of the components of the resource pool is discussed below.

The collect buffer controller module (206) includes functionality to receive command data from the host and store the command data on the host channel adapter. Specifically, the collect buffer controller module (206) is connected to the host and configured to receive the command from the host and store the command in a buffer. When the command is received, the collect buffer controller module is configured to issue a kick that indicates that the command is received.

In one or more embodiments of the invention, the virtual kick module (208) includes functionality to load balance commands received from applications. Specifically, the virtual kick module is configured to initiate execution of commands through the remainder of the transmitting processing logic (238) in accordance with a load balancing protocol.

In one or more embodiments of the invention, the queue pair fetch module (210) includes functionality to obtain queue pair state information for the QP corresponding to the data unit. Specifically, per the Infiniband® protocol, the original work request has a corresponding send queue and a receive queue in main memory in the host (202). The send queue and receive queue form a QP. Accordingly, the QP corresponding to the original work request is the QP corresponding to the data unit in one or more embodiments of the invention. More specifically, a work request is committed to a send queue in host memory before being transmitted to the HCA (200). A work request may be one or more commands for performing actions/operations sent from applications executing on the host (202) to the HCA (200). There may be multiple send queues and multiple corresponding receive queues in the host memory of both transmitting and responder nodes. The queue pair state information may include, for example, sequence number, address of remote receive queue/send queue, whether the QP is allowed to send or allowed to receive, and other state information.

In one or more embodiments of the invention, the DMA module (212) includes functionality to perform DMA with host memory. The DMA module may include functionality to determine whether a command in a data unit or referenced by a data unit identifies a location in host memory that includes the payload. The DMA module may further include functionality to validate that the process sending the command has necessary permissions to access the location, and to obtain the payload from the host memory, and store the payload in the DMA memory. Specifically, the DMA memory corresponds to a storage unit for storing a payload obtained using DMA.

Continuing with FIG. 2, in one or more embodiments of the invention, the DMA module (212) is connected to an Infiniband® packet builder module (IPBM) (214). In one or more embodiments of the invention, the Infiniband® packet builder module (214) includes functionality to generate one or more packets for each data unit and to initiate transmission of the one or more packets on the Infiniband® network (204) via the Infiniband® transmit ports (220). In one or more embodiments of the invention, the Infiniband® packet builder module may include functionality to obtain the payload from a buffer corresponding to the data unit, from the host memory, and/or from an embedded processor subsystem memory.

In one or more embodiments of the invention, the Infiniband® packet builder module (214) includes a set of multiplexers (MUXs (215)). The set of multiplexers (215) may include one or more MUXs. The set of MUXs (215) in the IPBM (214) is used to send a duplicate copy of a transmit (Tx) packet stream from the operational port of the Infiniband® ports (220, 221) into the trace port's payload RAM/trace buffer (244, 245), when the corresponding port (220, 221) is operating in trace mode. Specifically, the set of MUXs (215) in the IBPM (214) may replicate and direct a Tx packet stream to the Infiniband® packet receiver module (IPRM) (222), and the IPRM (222) may then direct the packet stream to the corresponding payload RAM/trace buffer (244, 245).

As described above, each Infiniband® port (220, 221) includes both transmit (Tx) and receive (Rx) ports for purposes of redundancy. In one or more embodiments, each port (220, 221) is associated with a corresponding payload RAM (244, 245) in which incoming packet payloads are stored. Each payload RAM/trace buffer (244, 245) may be a 128 kb storage area. When a port is in normal operating mode, incoming packets are processed by obtaining the payload of the packet, storing the packet payload in the port's corresponding payload RAM (244, 245) and inspecting/processing the packet header to determine the packet's destination. The packet payload remains stored in the payload RAM (244, 245) until packet processing has completed in the receiving processing logic (240) (i.e., the memory access is validated and the packet destination is determined). The packet payload is then copied into main memory in the host, and removed from the payload RAM.

When the port associated with a particular payload RAM is in trace mode, the corresponding payload RAM functions as a trace buffer. This is because when a port is in trace mode, no packets are accepted from the Infiniband® network on that port. Accordingly, the storage area occupied by payload RAM is available to be used as a trace buffer (244, 245). In one or more embodiments of the invention, when the payload RAM acts as a trace buffer for collection of trace data, the trace buffer (244, 245) is configured to receive and store packet streams from the IPRM (222) when one or more ports are operating in trace mode.

Turning to the receiving processing logic (240) of FIG. 2, in one or more embodiments of the invention, the Infiniband® packet receiver module (IPRM) (222) includes functionality to receive packets from the Infiniband® port(s) (220). Further, as described above, the IPRM (222) is also configured to replicate and send packet streams from the Tx/Rx ports (220, 221) into the trace buffer (244, 245), with the aid of one or more MUXs (225). In one or more embodiments of the invention, the IPRM (222) may include one or more MUXs (225) for receiving packets from the MUXs (215) in the IPBM (214) and/or replicating and directing packets from the ports (220, 221) to a corresponding trace buffer.

In one or more embodiments, the IPRM (222) also includes a set of control and status registers (CSRs) (224) for storing trace parameters and state indicators during tracing. For example, in one or more embodiments of the invention, there may exist CSRs for storing a trigger condition, a store qualifier, data prestore percentages, and a number of portions of each packet to store in the trace buffer. A trigger condition is a condition which must be met before packet stream data is collected into the trace buffer. The trigger condition may be specified by a particular order of packet header bits. The store qualifier is a filter used to store only particular packet portions which match the specified filter. A number of portions of each packet may specify the number of bits of each packet to store in the trace buffer. In one or more embodiments, one or more CSRs may also be used to trigger the start of a trace. Each of these CSRs may be located in the IPRM (224) or in another part of the HCA (200) accessible by the IPRM (224). Using the MUXs and the CSRs, the IPRM controls the trace buffer and the operation of a trace.

During normal packet processing operation, the IPRM (222) includes functionality to perform a checksum to verify that the packet is correct, parse the headers of the received packets, and place the payload of the packet in the payload RAM. In one or more embodiments of the invention, the IPRM (222) includes functionality to obtain the queue pair state for each packet from a queue pair state cache. In one or more embodiments of the invention, the Infiniband® packet receiver module includes functionality to transmit a data unit for each packet to the receive module (226) for further processing.

In one or more embodiments of the invention, the receive module (226) includes functionality to validate the queue pair state obtained for the packet. The receive module (226) includes functionality to determine whether the packet should be accepted for processing. In one or more embodiments of the invention, if the packet corresponds to an acknowledgement or an error message for a packet sent by the host channel adapter (200), the receive module includes functionality to update the completion module (216). In one or more embodiments of the invention, the receiver module (226) may also include functionality to cache at least a portion of an original work request in the completion cache (235) of the completion module (216).

Additionally or alternatively, the receive module (226) includes a queue that includes functionality to store data units waiting for one or more reference to buffer location(s) or waiting for transmission to a next module. Specifically, when a process in a virtual machine is waiting for data associated with a queue pair, the process may create receive queue entries that reference one or more buffer locations in host memory in one or more embodiments of the invention. For each data unit in the receive module hardware linked list queue, the receive module includes functionality to identify the receive queue entries from a host channel adapter cache or from host memory, and associate the identifiers of the receive queue entries with the data unit.

In one or more embodiments of the invention, the descriptor fetch module (228) includes functionality to obtain descriptors for processing a data unit. For example, the descriptor fetch module may include functionality to obtain descriptors for a receive queue, a shared receive queue, a ring buffer, and the completion queue.

In one or more embodiments of the invention, the receive queue entry handler module (230) includes functionality to obtain the contents of the receive queue entries. In one or more embodiments of the invention, the receive queue entry handler module (230) includes functionality to identify the location of the receive queue entry corresponding to the data unit and obtain the buffer references in the receive queue entry. In one or more embodiments of the invention, the receive queue entry may be located on a cache of the host channel adapter (200) or in host memory.

In one or more embodiments of the invention, the DMA validation module (232) includes functionality to perform DMA validation and initiate DMA between the host channel adapter and the host memory. The DMA validation module includes functionality to confirm that the remote process that sent the packet has permission to write to the buffer(s) referenced by the buffer references, and confirm that the address and the size of the buffer(s) match the address and size of the memory region referenced in the packet. Further, in one or more embodiments of the invention, the DMA validation module (232) includes functionality to initiate DMA with host memory when the DMA is validated.

In one or more embodiments of the invention, the HCA (200) includes a hardware DMA engine (242) that gets notified when packets are stored in the trace buffer (244, 245). The DMA engine (242) is configured to read trace data directly from the trace buffer (244, 245) and write the data to main memory in the host (202). Thus, in one or more embodiments, the DMA engine copies the data from the trace buffer (244, 245) into host memory. In one or more embodiments, the DMA engine (242) may copy trace data into host memory in real-time. When the trace buffer becomes full, the trace buffer is overwritten as new trace data is received, and the DMA engine continues to copy the data directly into host memory. Those skilled in the art, having benefit of this disclosure, will appreciate that implementation of the DMA engine (242) in the HCA (200) is optional. When such an engine is implemented in the HCA, reading of trace data by the ARM processor of the EPS may be bypassed entirely to facilitate a much larger collection of data from the HCA directly into host memory.

In one or more embodiments of the invention, a circuit (not shown) may be implemented in hardware (i.e., on the HCA) that is configured to implement a trace buffer state machine. In one or more embodiments, the trace buffer state machine has four states: Idle (i.e., no tracing active), Waiting (i.e., waiting for trigger and storing data in prestore part of trace buffer), Sampling (trigger has occurred and storing data in poststore part of trace buffer), and Done (i.e., trace buffer full or trace stop forced). At any give time after a trace is initiated, the state of the trace may be obtained from the trace buffer state machine implemented in the hardware circuit.

Figure 3:
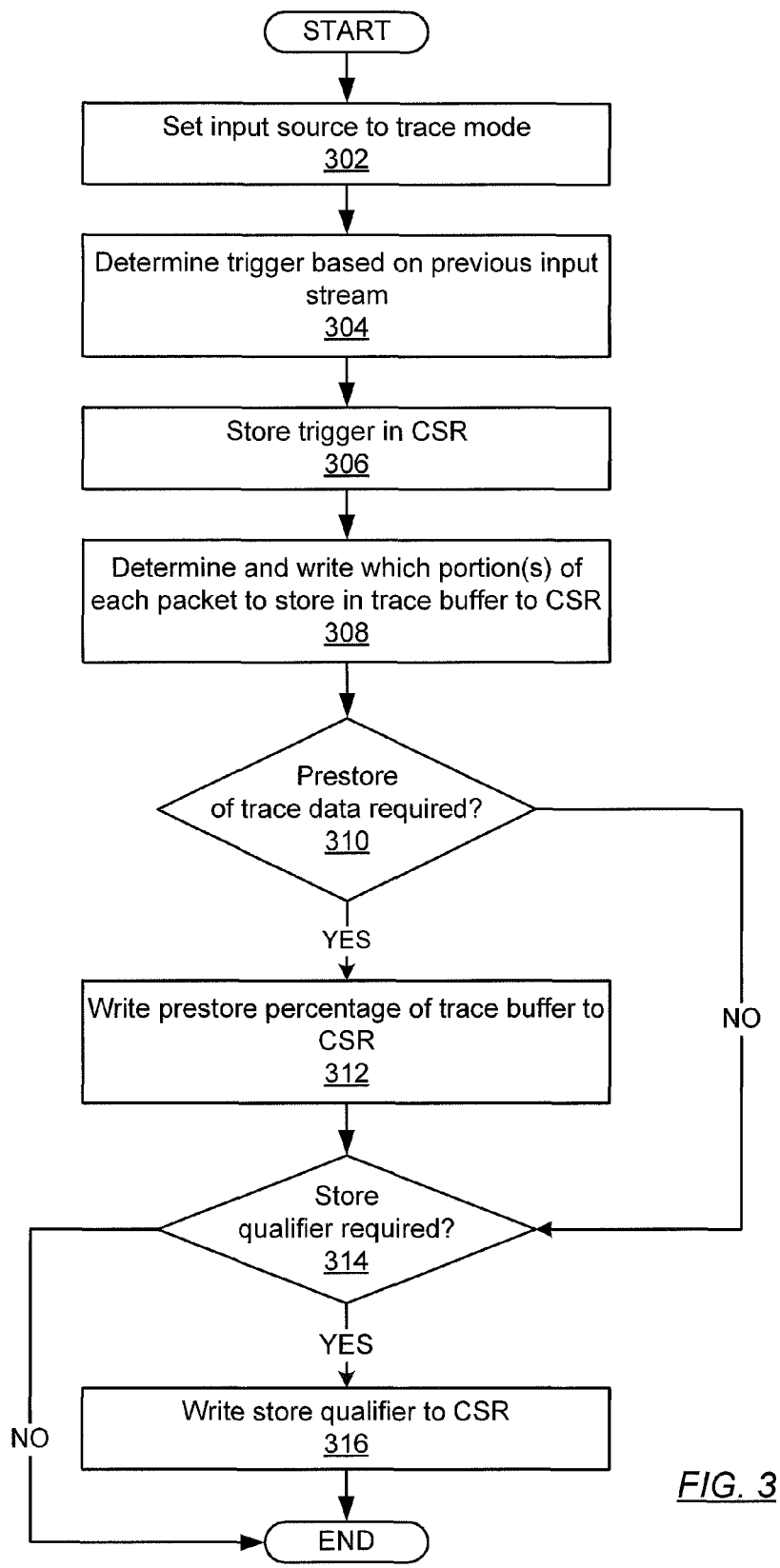
FIGS. 3-4 show flowcharts in one or more embodiments of the invention.

FIG. 3 shows a flowchart of a method for configuring a trace to be managed in the HCA in accordance with one or more embodiments of the invention. While the various steps in the flowchart are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIG. 3, may be included in performing this method. Accordingly, the specific arrangement of steps shown in FIG. 3 should not be construed as limiting the scope of the invention.

To carry out the process of configuring a trace as described below in FIG. 3, an initial request to start a trace due to errors observed in network activity may be sent from the EPS firmware or HCA driver in the host, to the HCA. In alternate embodiments, software executing on the host may also request a trace to be initiated. Upon receiving such a request, the HCA includes functionality to configure and manage the hardware tracer components of the HCA and the trace data.

Specifically, in ST 302, an input source is set to trace mode. The input source may be set to trace mode by the EPS. Specifically, the EPS may send a signal to the HCA port to operate in trace mode. Alternatively, the HCA itself may set the input source to trace mode. When more than one input source is available, a subset of the number of input sources may be set to trace mode, while at least one of the multiple input sources is reserved for normal operation. More specifically, in one or more embodiments of the invention, the tracer may be setup to trace one of four input sources: data received (Rx) from one of the two receive ports, Rx data from the other of the two receive ports, data transmitted (Tx) to one of the transmit ports, and Tx data to the other of the two transmit ports. If no trigger source is selected, normal mode is used.

Based on one or more previous packet streams, a trigger for the trace is determined (ST 304). In one or more embodiments of the invention, the trigger is a condition that triggers the collection of trace data in the trace buffer. When errors in previous packet streams are observed or recorded, a trigger condition is determined, which indicates where in the packet stream trace data collection should begin. When a trigger condition is determined, the trigger condition is stored in a CSR in the IPRM of the HCA (ST 306). In one or more embodiments, the trigger condition may be set up to match fields in the Infiniband® packet header and errors. The Infiniband® packet header is approximately 128 bits. Accordingly, the trigger condition may be set up as one or more of the 128 bits being a 1 or 0. Unused bits in the stored trigger condition may be masked.

In ST 308, a determination is made regarding which portion of each packet to store in the trace buffer, after the trigger condition is met. In normal packet processing, only the packet payload is stored in the payload RAM. However, in trace mode, it may be important to store one or more portions of the packet header, one or more portions of the packet payload, or the entire packet including both the header and the payload. Accordingly, the number of data units or portions of the packet to store in the trace buffer is determined and stored in a CSR (ST 308). Alternatively, this CSR may be defined such that the complete payload will be stored in trace buffer. For example, if packet has a 4K Byte payload, the trace may be set up to store only the first 4 portions of the packet by setting the corresponding CSR to 4. Each packet portion may be set to a specific number of bits. For example, if each packet portion is 256 bits, then storing four portions of each packet which matches the trace parameters would result in a total of 1024 bits of the packet being stored in the trace buffer.

At this stage, a determination is made as to whether prestore of trace data is required (ST 310). Conceptually, the trace buffer may be divided into prestore and poststore of trace data. Prestore data is data to be collected before the trigger condition is met, i.e., packets from the packet stream that are stored in the trace buffer before errors were observed in previous packet streams. Often times, for purposes of debugging errors in network activity, data processed before the errors are observed may be analyzed to determine the cause of the error(s). More specifically, if an error is known to occur, for example, after packet number seven (7) of each bus cycle of a packet stream, analyzers of the trace data may require one or more packets before packet number 7 to be stored as prestore data to obtain more information about how or why the error occurs after packet number 7. Those skilled in the art will appreciate that the decision as to whether to collect prestore data may depend on the type of error(s) being observed, and/or whether the error occurs repeatedly.

To facilitate the collection of prestore data as part of the trace, a trace buffer storage mode may be set to a particular percentage of the trace buffer that is allocated to prestore. In one or more embodiments of the invention, the trace buffer may be placed in one of four different configurations with respect to prestore and poststore data. Specifically, prestore may be set up to be 0%, 25%, 50% or 75% of total trace buffer capacity. For example, when the prestore is set to 25%, the first ¼ of the trace buffer storage area is reserved for prestore data. The remaining ¾ of the trace buffer is then reserved for storing poststore data (i.e., data after the trigger condition is met). When prestore data is required or requested, a percentage of the trace buffer allocated to prestore data is written to a CSR (ST 312). Those skilled in the art will appreciate that the prestore percentage may be any suitable value, and is not limited to the examples described above.

In ST 314, another determination is made as to whether a store qualifier is required (ST 314). If a store qualifier is required, the store qualifier is stored to a CSR (ST 316). The store qualifier, similar to the other trace parameters, is another filter that is used to store only the packets from the packet stream into the trace buffer that match a particular criteria. In one or more embodiments of the invention, only data associated with a packet with fields in Infiniband® header as defined in the store qualifier may be stored in trace buffer. The store qualifier may be, for example, a particular queue pair (QP) identifier, such that only the packets which match a particular QP are stored in the trace buffer. Those skilled in the art, having benefit of this disclosure, will appreciate that the trigger, store qualifier, and any other suitable parameter or filter for collecting trace data may apply to any part of the packet, and are not limited to specifying bits in the Infiniband® packet header. Thus, for example, the store qualifier may specify that only packets with an Ethernet header bundled with the Infiniband® header, or packets having any other suitable protocol header, be stored in the trace buffer. Any bit in store qualifier may be masked.

Any of the aforementioned parameters for configuring a trace in the HCA may be null (0). Thus, for example, if a prestore is not defined or stored, then the trace buffers only stores packet data after the trigger condition is met (i.e., the entire trace buffer is poststore data). Similarly, if no store qualifier is defined, then this additional filter is not taken into account when a packet from the packet stream is compared to the parameters of the trace to determine whether the packet is to be stored in the trace buffer.

Figure 4:
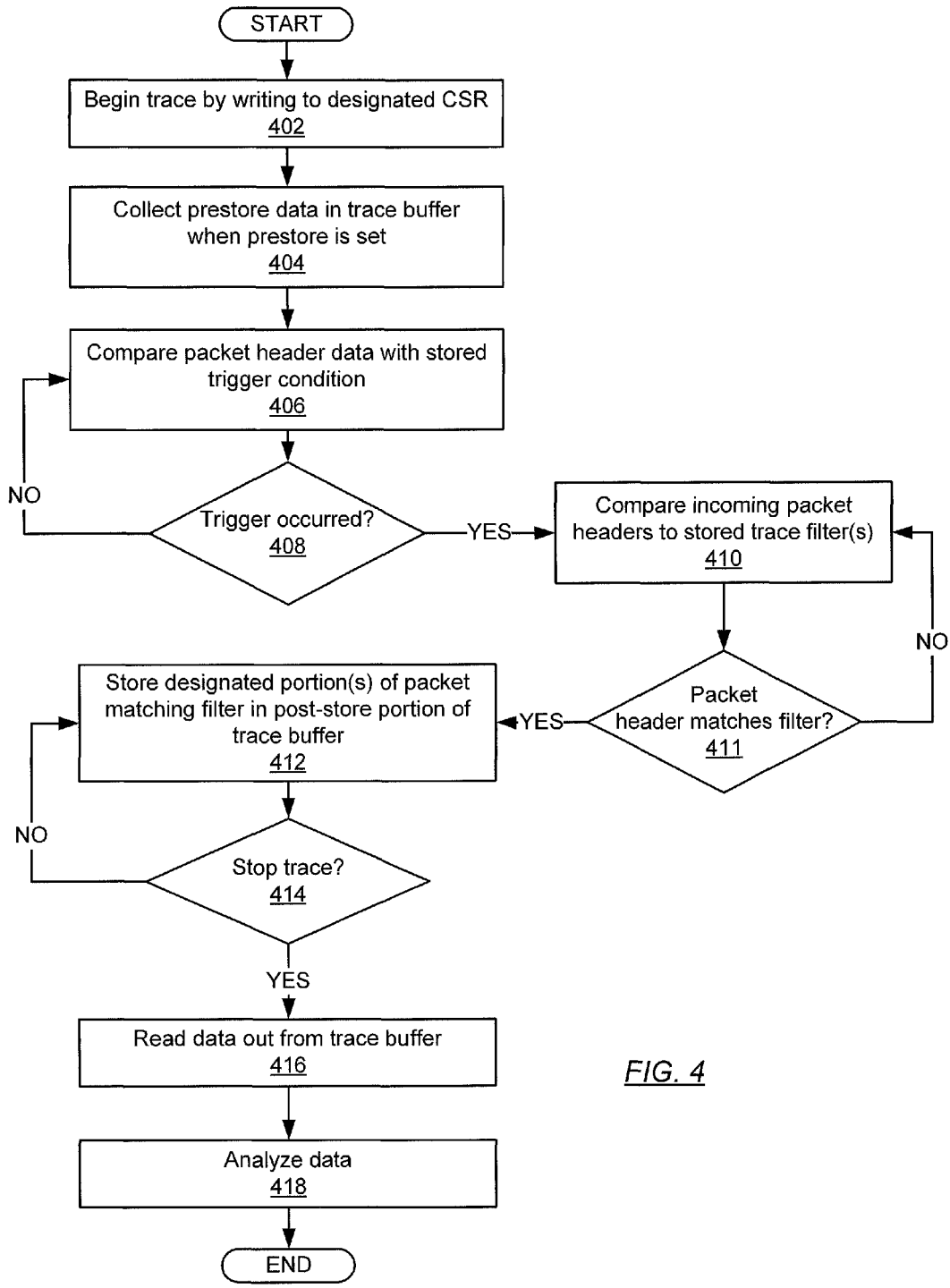

Those skilled in the art, having benefit of this disclosure, will appreciate that the aforementioned method steps are performed to configure the trace buffer for collecting trace data. Further, the aforementioned configuration steps may be repeated each time a new trace is requested by a system component. FIG. 4 shows a method for performing a trace using the parameters set up in FIG. 3. While the various steps in the flowchart are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIG. 4, may be included in performing this method. Accordingly, the specific arrangement of steps shown in FIG. 3 should not be construed as limiting the scope of the invention.

The start of a trace is triggered by writing to a CSR in the HCA. Thus, in ST 402, a command or code is written to a designated CSR. Before the write to the designated CSR occurs, the state machine for the trace buffer is in the Idle state. Once the CSR is written to, the trace buffer state machine is in the Waiting state. In one or more embodiments of the invention, the start of a trace indicates that the packet stream data associated with the trace input source (i.e., one or more of the Infiniband® ports) is replicated and directed, via the IPRM of the HCA, to the trace buffer. In this case, the payload RAM normally used to store packet payloads for incoming packet streams is dynamically repurposed to become a trace buffer for storing at least trace data which match the criteria/parameters of the trace. In addition, when a prestore is set in a corresponding CSR, prestore data is collected into the trace buffer (ST 404). Thus, packet stream data before the trigger condition is met is duplicated and stored into the trace buffer until the percentage of prestore data is met.

In one or more embodiments of the invention, prestore data may be stored according to the number of designated portions of each packet specified as one of the trace parameters. Thus, if four packet portions are stored in the designated CSR, prestore data is also stored as four portions of each packet. Once the allocated percentage of prestore data is collected, remaining packets may be discarded or ignored until the trigger condition is met. If more than the allocated percentage of prestore data is collected, the excess prestore data may be dumped from the trace buffer. In one or more embodiments of the invention, prestore data is valid when the trace buffer state machine is in the Sampling or the Done state.

Once the trace buffer is filled up to the designated percentage of prestore data, the incoming packet stream data is compared to the trigger stored in the CSR in ST 406. Thus, the bits of the packet header are compared with the bits stored as the trigger condition. When a match occurs, the trigger has been met (ST 408). Until the trigger is met (ST 408), the process continues to compare packet header data with the stored trigger condition (ST 406). In one or more embodiments of the invention, when the trigger condition is met, trace buffer storing mode changes from prestore to poststore, and the trace buffer state machine is in the Sampling state. The trigger condition may be, for example, a particular packet identification number that identifies the packet after which errors began occurring in the previously observed packet data streams. Alternatively, the trigger condition may be a queue pair number, a packet header including an Ethernet over Infiniband® header, or any other suitable trigger condition.

The remaining percentage of the buffer allocated to poststore data is then used to store packets which match any other stored trace parameters/filters. Thus, packets from the packet stream are compared to trace filters that may be stored in CSRs (ST 410). Next, a determination is made as to whether the packet header matches one or more filters, such as, for example, the store qualifier (ST 411). For example, the store qualifier may specify that after the packet identified by the trigger condition, all packets matching a particular QP number are to be duplicated and stored in the trace buffer. This may be useful when, for example, only one or more particular send/receive QPs are exhibiting errors. When other filters such as a store qualifier are set, it may be that not all packets after the trigger are stored in the poststore of the trace buffer. Rather, only packets matching one or more particular filters are stored to the poststore portion of the trace buffer (ST 412). More specifically, the designated portion(s) of each packet matching the filter is/are duplicated and stored in the poststore of the trace buffer. If the packet does not match the filter, the packet may be discarded or ignored, and the next packet header is compared to the filter stored to determine if it matches the filter criteria (ST 410). In alternate embodiments not shown in FIG. 4, the trace buffer may be continuously written when the store qualifier is met or when no other filters except the trigger condition are stored in CSRs.

Those skilled in the art will appreciate that a duplicate copy of the packet stream from the selected source of the trace data is copied into the trace buffer without affecting the packet stream's normal operation. Accordingly, normal operation may continue via another port on the HCA, while the port in trace mode is configured to duplicate and store relevant portions of packets in the trace buffer.

In one or more embodiments of the invention, a trigger address defines the boundary between prestore and poststore portions of the trace buffer. The trigger address is valid when the trace buffer state machine is in the Sampling or the Done state. Those of ordinary skill in the art will appreciate that which part of trace buffer is prestore/poststore may be determined by looking at the trigger address and trace buffer storage mode, and a timestamp associated with an entry in the trace buffer. In one or more embodiments of the invention, the boundary within the trace buffer is conceptual, and accordingly, there is no marking or physical designation to indicate when prestore ends and when poststore begins. In one or more embodiments of the invention, a trigger address may be stored when the trigger condition is met. In this case, the trigger address may indicate the boundary between prestore data and poststore data. Poststore data is valid when the trace buffer state machine is in the Done state.

In Step 414, a determination is made as to whether the trace has stopped. This may occur automatically, for example, when the trace buffer is at capacity. Said another way, the trace wraps when the maximum address of the trace buffer is reached. Alternatively, a stop trace may be forced by writing to a particular CSR. For example, the same CSR used to start the trace may be written to again to stop the trace. As noted above, the forced stop may be employed, in one or more embodiments, when trace data is being read out of the trace buffer in real-time by the DMA engine in the HCA. Until the trace is stopped, the process continues comparing and storing the designated portions packets in the trace buffer (ST 414). When the trace is stopped (ST 414), the trace data may be read out from the trace buffer by the EPS, in one or more embodiments of the invention (ST 416). Specifically, the EPS includes a port that allows the EPS to read directly from the trace buffer in the HCA. The EPS may place the data read out from the trace buffer into shared memory or directly in main memory in the host. In ST 418, the trace data may be displayed and/or analyzed for purposes of debugging errors. The analysis of the trace data may be performed by a human (e.g., engineer, developer, etc.) or a system configured to analyze network activity.

Figure 5:
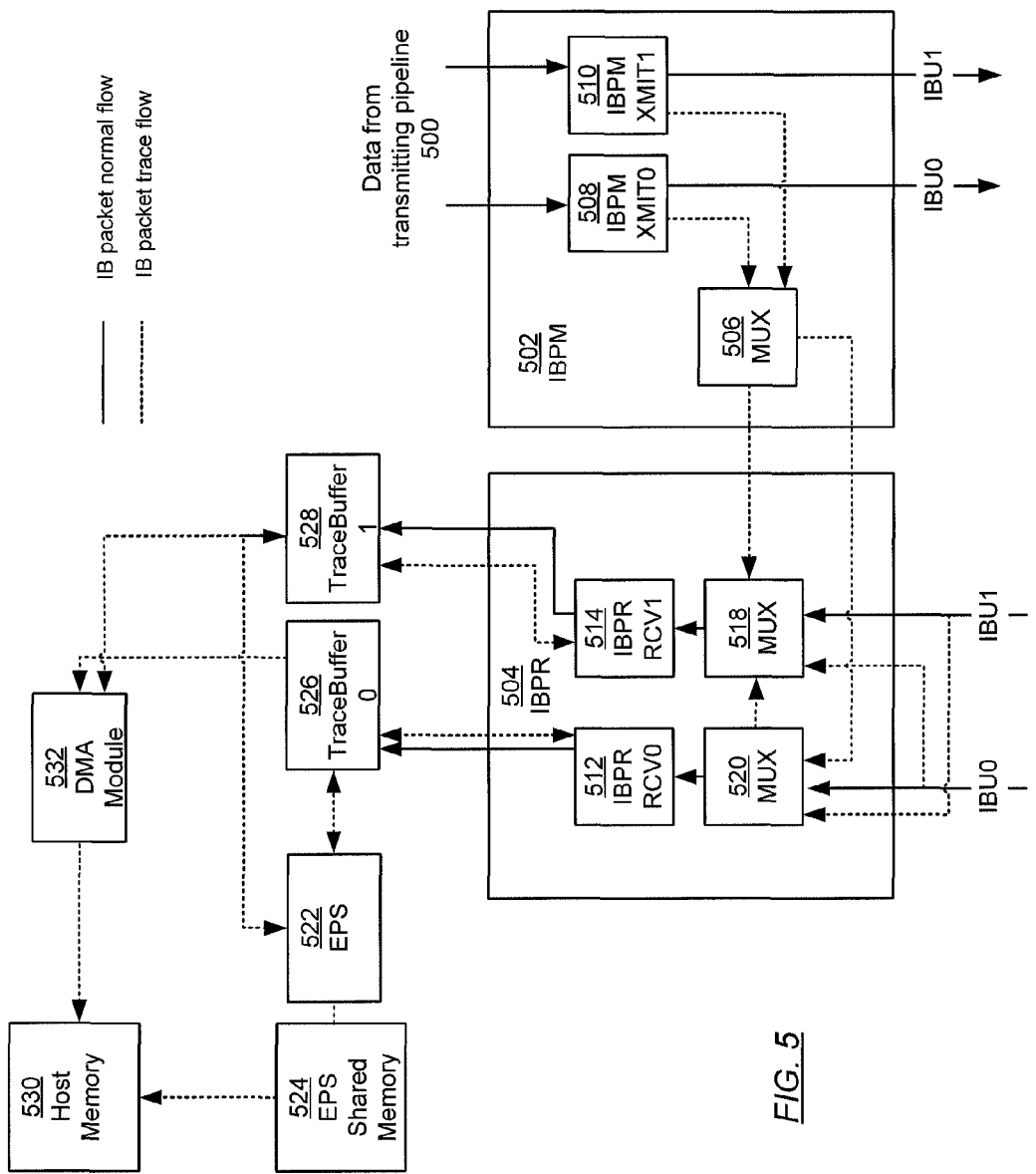
FIG. 5 shows an example in one or more embodiments of the invention.

FIG. 5 shows an example of normal packet processing data flow and packet data flow when an input source is operating in trace mode, in accordance with one or more embodiments of the invention. Specifically, FIG. 5 shows the data flow from the HCA pipeline, through either the IBPM (502) or the IBPR (504), or both, and to the payload RAM/trace buffer (526, 528).

Briefly, normal packet processing involves the data from the processing pipeline of the HCA (500) (as shown in FIG. 2) being directed out of the IPBM (502) (indicated by the arrows IBU0 and IBU1) and into the IBPR (504) (indicated by the IBU0 and IBU1 arrows directed into the IBPR). The normal data flow then shows that the data is received by one of the IBPR receive (RCV) access ports (512, 514) and the packet payload is placed into the corresponding payload RAM (called a trace buffer in FIG. 5) (526, 528). Thus, whichever port receives the data via the IBPR (504), that port's corresponding payload RAM (526, 528) receives the packet payload. As embodiments of the invention are directed to the dynamic repurposing of the payload RAM into a trace buffer when one or more of the ports are in trace mode, the remaining discussion of FIG. 5 describes the data flow that occurs when a trace is initiated, and when the payload RAM is configured and managed as a trace buffer by the HCA.

In one or more embodiments of the invention, data from the transmitting pipeline (500) is transmitted by one of the two transmit ports (508, 510) in the IPBM (502). Specifically, IBPM XMIT0 (508) corresponds to data transmitted to Infiniband® port IBU0. IBPM XMIT1 (510) corresponds to data transmitted to Infiniband® port IBU1. From the IBPM XMIT0 (508) or XMIT1 (510), the data is directed by the MUX (506) in the IPBM (502) to one or of the MUXs (518, 520) in the IBPR (504). In one or more embodiments of the invention, data may also be received directly by the IBPR (504) as indicated by the dotted arrows from IBU0 and IBU1. Specifically, IBPR RCV0 (512) corresponds to data received from Infiniband® port IBU0. IBPR RCV1 (514) corresponds to data received from Infiniband® port IBU1. In one or more embodiments, each of the RCV0 and RCV1 ports (512, 514) have an associated trace buffer (TraceBuffer0 (526), TraceBuffer1 (528)). From the RCV0 or RCV1 ports (512, 514), the data is directed to the corresponding trace buffer (526, 528). In the example shown, the EPS (522) then reads out the data from the trace buffer (526, 528), and places the data into EPS shared memory (424), until the time that the data is copied to host memory (430). In one or more embodiments of the invention, the EPS (522) is notified when the trace buffer is full via an interrupt. Throughout the process described by way of this example, the EPS (522) is also updated with the correct trace buffer state information, as necessary.

Using the example data flow shown in FIG. 5, consider the scenario in which the transmit port of the IBU0 Infiniband® port is set to trace mode. In this scenario, packet stream data coming into the IBPM XMIT0 (508) is compared to the trigger condition and to any other stored filters to determine which packet headers match the trace parameters that are set up in the CSRs in the HCA. If the trace buffer is set up for prestore, then data before the trigger condition is met would also be duplicated and stored in the trace buffer in much the same manner. When a packet header is determined to match the trace parameters after the trigger condition is met, the packet or packet portions to be stored in the trace buffer is/are directed from the IBPM XMIT0 (508), via the MUX (506), to one of the MUXs (518, 520) in the IPRM (504). Packets not matching the trace parameters may be discarded or ignored. The packet may then be directed to the trace buffer (426, 428) corresponding to the port where the data is received in the IBPR (404), regardless of whether the data is packet stream data redirected from the transmit port, or data directly received into the IBPR (504). As packets matching the filter criteria are duplicated and stored to the corresponding trace buffer (426, 428), the trace buffer fills the poststore portion of the buffer with trace data until the trace buffer is full.

The EPS (522) then reads the data out from the trace buffer and into shared memory (524), where the data sits until it is copied to host memory (530). Alternatively, the DMA module (532) may read the data out from the trace buffer (526, 528) and directly write the trace data into host memory (530) in real-time, during operation of the trace. In this case, the EPS (522) and shared memory (524) may be bypassed entirely. Once the trace data is copied to host memory (430) the trace data may be displayed for analysis and debugging of errors. At this stage, the port set to trace mode may be reset to idle or normal mode, depending on, for example, whether network activity is heavy or light.

As shown by way of the example, embodiments of the invention provide a mechanism for utilizing storage area already present in the HCA for purposes of storing packet payload data as a trace buffer to collect trace data. Specifically, a trace mode in the HCA ports is provided in order to obtain more visibility into potential network errors without significant area cost. Further, tracing capability is provided on one port without affecting operation of another port that may be in normal operating mode (i.e., an active port). That is, the normal packet stream is completely unaffected on the Active port. This ensures that the trace process itself does not affect the results of the trace. Further, embodiments of the invention leverage the redundant design implemented in the HCA to add the functionality of tracing for purposes of debugging errors.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for debugging network activity, comprising:
  receiving, by a host channel adapter (HCA), a packet stream comprising a plurality of packets;
  comparing a packet header of each of the plurality of packets to a trigger condition to determine whether the trigger condition has been met;
  after the trigger condition has been met, comparing each packet header of the plurality of packets to one or more trace filters stored in the HCA to identify matching packets;
  duplicating one or more portions of the matching packets and storing the duplicated one or more portions of the matching packets in a trace buffer, wherein the trace buffer is located in the HCA and is dynamically repurposed from a payload random access memory (RAM) to the trace buffer when a corresponding port of the HCA for transmitting or receiving the packet stream is set to trace mode; and
  stopping a trace of the one or more portions of the packets and copying the one or more portions of packets from the trace buffer to host memory.

2. The method of claim 1, further comprising:
  setting the corresponding port to trace mode when the corresponding port is idle; and
  initiating the trace by writing to a designated control and status register (CSR).

3. The method of claim 1, further comprising:
  collecting prestore data in the trace buffer when a prestore percentage is written to a CSR,
  wherein a first portion of the trace buffer comprises the prestore data and a second portion of the trace buffer comprises poststore data comprising the one or more portions of packets stored after the trigger condition is met.

4. The method of claim 3, further comprising:
  updating a state of the trace buffer from idle to waiting when the prestore data is being collected in the trace buffer;
  updating the state of the trace buffer from waiting to sampling when poststore data is being collected in the trace buffer; and
  updating the state of the trace buffer from sampling to done when the trace is stopped.

5. The method of claim 1, wherein the one or more trace filters comprises at least a store qualifier.

6. The method of claim 1, wherein the trigger condition and a number of portions of packets to store in the trace buffer after the trigger condition is met are stored in CSRs in the HCA.

7. The method of claim 1, further comprising:
  analyzing the one or more portions of packets in the host memory to debug errors observed in network activity.

8. The method of claim 1, further comprising:
  receiving a request to start a trace from an embedded processor system (EPS) operatively connected to the HCA.

9. The method of claim 8, wherein the EPS comprises access to the trace buffer and is configured to:
  read the one or more portions of packets out from the trace buffer, wherein the EPS is notified by the HCA via an interrupt when the trace buffer is full or when the trace is stopped;
  copy the one or more portions of packets to shared memory; and
  copy the one or more portions of packets from shared memory to the host memory.

10. The method of claim 1, wherein the one or more portions of packets are continuously read out by the HCA and written to host memory in real-time during the trace.

11. A host channel adapter (HCA), comprising:
  at least two ports for transmitting and receiving a packet stream, wherein each of the at least two ports operate in one selected from a group consisting of normal mode and trace mode;
  a trace buffer configured to store trace data corresponding to each of the at least two ports of the HCA, wherein the trace buffer is dynamically repurposed from a payload random access memory (RAM) to the trace buffer when the corresponding port of the HCA is set to trace mode;
  a packet receive module (PRM) comprising a set of control and status registers (CSRs) for storing trace parameters, and at least one multiplexer for duplicating the packet stream from one of the at least two ports and storing the duplicated packet stream to a corresponding trace buffer when the one of the at least two ports is in trace mode; and
  a direct memory access (DMA) engine configured to continuously read trace data out of the trace buffer and write the trace data to host memory,
  wherein the HCA is configured to:
    receive the packet stream comprising a plurality of packets;
    compare a packet header of each of the plurality of packets to a trigger condition stored in one CSR of the set of CSRs to determine whether the trigger condition has been met;

after the trigger condition has been met, compare each packet header of the plurality of packets to one or more trace filters stored in the set of CSRs to identify matching packets;

duplicate and store, via the multiplexer, one or more portions of the matching packets to the corresponding trace buffer; and stop a trace of the one or more portions of the packets, wherein after the trace is stopped, the one or more portions of packets in host memory are analyzed for debugging errors.

12. The HCA of claim 11, wherein the HCA is further configured to:

collect prestore data in the trace buffer when a prestore percentage is written to one CSR of the set of CSRs, wherein a first portion of the trace buffer corresponds to prestore data and a second portion of the trace buffer corresponds to poststore data comprising the one or more portions of packets stored after the trigger condition is met.

13. The HCA of claim 12, wherein the trace is stopped automatically when a maximum address of the trace buffer is reached.

14. The HCA of claim 12, wherein the DMA engine is configured to read out data from the trace buffer in real-time.

15. A system, comprising:

a host comprising memory;

a host channel adapter (HCA) operatively connected to the host and comprising:

at least two ports for transmitting and receiving a packet stream, wherein each of the at least two ports operate in one selected from a group consisting of normal mode and trace mode;

a trace buffer configured to store trace data corresponding to each of the at least two ports of the HCA, wherein the trace buffer is dynamically repurposed from a payload random access memory (RAM) to the trace buffer when the corresponding port of the HCA is set to trace mode;

a set of control and status registers (CSRs) for storing trace parameters; and at least one multiplexer for duplicating the packet stream from one of the at least two ports and storing the duplicated packet stream to a corresponding trace buffer when the one of the at least two ports is in trace mode; and an embedded processing system (EPS) configured to:

request a trace to be initiated on the HCA; and read trace data out of the trace buffer and write the trace data to host memory, wherein the HCA is configured to:

receive the packet stream comprising a plurality of packets;

compare a packet header of each of the plurality of packets to a trigger condition stored in one CSR of the set of CSRs to determine whether the trigger condition has been met;

after the trigger condition has been met, compare each packet header of the plurality of packets to one or more trace filters stored in the set of CSRs to identify matching packets;

duplicating and storing, via the multiplexer, one or more portions of the matching packets to the corresponding trace buffer; and stop a trace of the one or more portions of the packets.

16. The system of claim 15, wherein the HCA is further configured to:

stop the trace automatically when a maximum address of the trace buffer is reached.

17. The system of claim 16, wherein the HCA is further configured to:

notify the EPS when the maximum address of the trace buffer is reached by an interrupt.

18. The system of claim 15, wherein the host is configured to:

display and analyze the one or more portions of the matching packets to debug errors observed in network activity.

19. The system of claim 18, wherein the network is the Infiniband® network and the HCA is an Infiniband® HCA.

* * * * *

UNITED STATES PATENT AND TRADEMARK OFFICE
CERTIFICATE OF CORRECTION

| | |
|---|---|
| PATENT NO. | : 9,148,352 B2 |
| APPLICATION NO. | : 13/722083 |
| DATED | : September 29, 2015 |
| INVENTOR(S) | : Manula et al. |

It is certified that error appears in the above-identified patent and that said Letters Patent is hereby corrected as shown below:

In the specification

Column 9, line 60, after "any" delete "give" and insert -- given --, therefor.

Signed and Sealed this
Thirty-first Day of May, 2016

Michelle K. Lee
*Director of the United States Patent and Trademark Office*